3,476,796
PHTHALIC ACID DIESTER PREPARATION
Shiro Kudo, Sakai-shi, Yoshihisa Mihara and Taiichi Adachi, Yokkaichi-shi, Shinichi Tsurugi, Sakai-shi, Tomoatsu Usuku, Yokkaichi-shi, and Isamu Wada, Sakai-shi, Japan, assignors to Kyowa Hakko Kogyo Co., Ltd., Tokyo, Japan, a corporation of Japan
Filed May 3, 1965, Ser. No. 452,491
Claims priority, application Japan, May 2, 1964, 39/24,827
Int. Cl. C07c 67/02, 69/80
U.S. Cl. 260—475
10 Claims

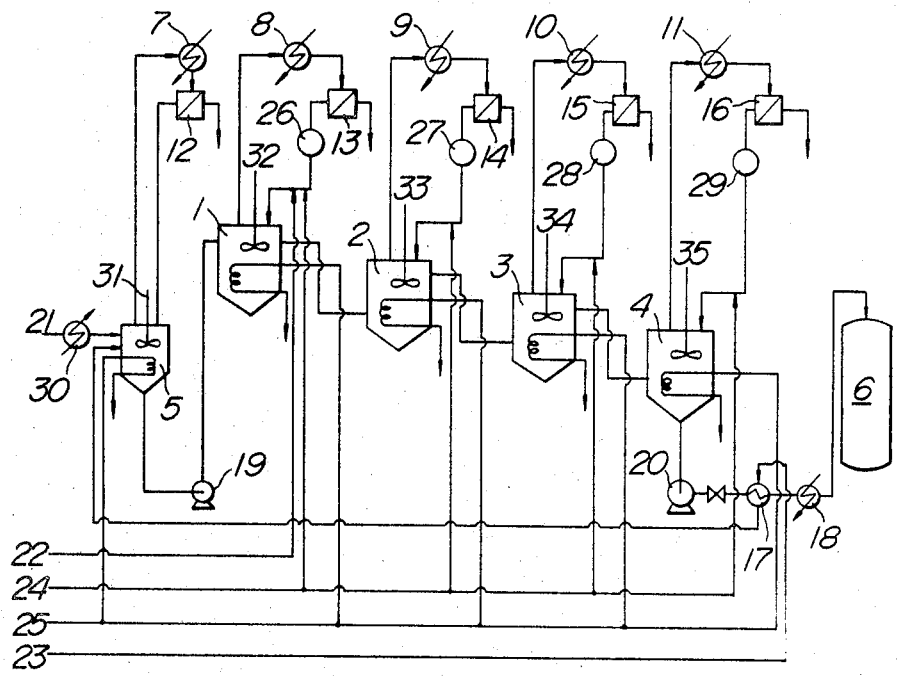

ABSTRACT OF THE DISCLOSURE

A continuous process for the production of diesters of phthalic acid and saturated alcohols containing from 4 to 10 carbon atoms which comprises continuously feeding a monoester of phthalic acid and a saturated alcohol containing from 4 to 10 carbon atoms, a carrier capable of forming an azeotropic mixture with water, and an esterification catalyst to the first of a plurality of reactors, while maintaining esterification reaction conditions within said first reactor, distilling said carrier and the water formed during the esterification from the reaction system, returning said carrier to said first reactor, introducing the reaction solution from said first reactor to the second reactor within said plurality of reactors, supplying said carrier to said second reactor, maintaining esterification reaction conditions within said second reactor in order to effect reaction in a similar manner as that carried out in said first reactor, and effecting a reaction within each successive reactor within said plurality of reactors in the same manner as in said second reactor to obtain the desired reaction product.

---

This invention relates to the production of esters. More particularly, it relates to a continuous process for the preparation of high-boiling esters. Even more particularly, the invention relates to a continuous process for the production of diesters of phthalic acid and saturated alcohols containing from 4 to 10 carbon atoms.

As is well known in the art, esterification is a reversible reaction between an alcohol and an acid, and there is a definite equilibrium relationship which is characteristic for each particular reaction system. In order to obtain a satisfactory completion of reaction, it is necessary to use a large excess amount of either the acid or the alcohol or, in the alternative, to eliminate the water formed by the reaction from the system. In general, in commercial operations, a desired completion of reaction is achieved by the use of methods which eliminate water from the reaction system such as the employment of a suitable carrier capable of forming an azeotrope therewith. Since such supplementary measures are necessary in order to obtain an efficient and satisfactorily complete reaction, attempts to render methods involving esterification reactions continuous have not been a simple task and have involved considerably difficult problems.

Of course, these problems are relatively simple in the case of the production of low-boiling esters such as ethyl acetate because, in this case, ethyl acetate itself acts as a carrier of water. Even when the reaction does not proceed to completion, the ester produced as well as the raw materials employed can be separated by a simple rectification at atmospheric pressure. Accordingly, unreacted raw materials can then be returned to the reaction system after separation.

However, in the case of the production of high-boiling esters such as diesters of phthalic acid, it is impossible to use such a simple distillation. If the distillation is not carried out at a sufficiently high vacuum, the diester of phthalic acid decomposes. Furthermore, since in practical use the presence of free acid in the product cannot be tolerated, the reaction product is usually subjected to distillation after it has been neutralized. This means that the esterification must be nearly complete, i.e., must have progressed nearly 100%, because, otherwise, any large amount of remaining acid would be lost when the product is neutralized with alkali.

The difficulties involved in rendering the production of thermally decomposable and high-boiling esters continuous resides in this latter point, i.e., substances that are difficult to distill must be made to react to nearly a 100% conversion. For this reason, the commercial production of diesters of phthalic acid has been carried out mostly by batch processes.

However, there are difficulties and deficiencies in such batch processes. For example, the charging and discharging of the reactor are troublesome operations. Moreover, time is wasted during such operations. Since heating and cooling must be repeated every time one of these charging or discharging operations is carried out, the batch process is disadvantageous and affords various drawbacks not only calorimetrically but also in producing irregularities, i.e., the consumption of heat is variably high and low or at-peak and off-peak at various intervals. The batch method of production is not adequate and cannot be adopted commercially, especially in the case of the large scale production processes employed in the petrochemical industry.

As a result of these various problems, there have been many attempts made in the past at producing high-boiling esters, such as diesters of phthalic acid, in a continuous manner. For example, Berman et al. studied a method for producing dibutyl phthalate with a rectifying column-type reactor [Industrial and Engineering Chemistry, 40, 2139 (1948)], Riese et al. also studied and designed a rectifying column-type reactor [Transactions of the American Institute of Chemical Engineering, 41, 157 (1945)], and Canapary et al. made studies on the esterification of citric acid and hexyl alcohol with a coil type reactor [Industrial and Engineering Chemistry, 47, 797 (1955)]. Several other studies have been made, but every one of these is similar in nature to those aforementioned.

Coil-type reactors, the object of some of these studies, cannot eliminate water from the reaction system. Hence, a large excess amount of alcohol is required when employing this type of reactor. This results in not only a calorimetrical disadvantage but also in a loss of alcohol in subsequent process steps. As to the latter, for example, if the alcohol is water-soluble, it is lost during the steps of neutralization and washing after the esterification.

The rectifying column reactor provides a theoretically satisfactory solution since the reaction and the dehydrating distillation can be carried out simultaneously by the use of a suitable carrier. However, since the esters formed do not boil at the reaction conditions employed, it is impossible for them to become the heat source for the dehydrating distillation. Moreover, since the relationship between the temperature and the concentration in each plate is extremely complicated, the maintenance of such relationships at a stationary state is difficult even if instrumentation is extensively used as a control thereon. Furthermore, once the balance of the reaction system is destroyed, a long time is required for it to be brought back to a stationary state. Moreover, in order to realize an esterification conversion approximating 100%, it is necessary to use a fairly large excess of alcohol.

From the point of view of the design of these reactors, the preparation and the analysis of equilibrium data for the gaseous and liquid phases of 4-component systems becomes necessary. In this regard, the design and control of such reactors for continuous esterification processes involves extremely complicated problems.

One of the objects of the present invention is to provide a process for the production of esters which overcomes the disadvantages and deficiencies of the prior art methods.

Another object of the present invention is to provide a process for the production of esters which may be carried out continuously.

A further object of the invention is to provide a continuous process for the production of high-boiling esters which amy be carried out advantageously and with high efficiency on an industrial scale.

A still further object of the invention is to provide a continuous process for the production of high-boiling esters having a superior production efficiency which may be carried out in reactors of fairly simple design while yet providing an efficacious process with a minimum of problems.

Yet another object of the present invention is to provide a continuous process for the production of high-boiling esters which may be controlled automatically.

These and other objects of the present invention will become apparent to those skilled in the art from a reading of the following specifications and claims.

It has been discovered that an advantageous process for the continuous production of high-boiling esters may be accomplished by the present invention, which is quite different from the prior art processes. The invention is based upon studies on continuous esterification processes with a multitude of reactors, preferably those equipped with stirrers.

In accordance with the present invention, an advantageous continuous process for the production of high-boiling esters is effected by continuously charging a mixture of the desired saturated alcohol containing from 4 to 10 carbon atoms, a monoester of phthalic acid, a carrier and an appropriate catalyst to the first of a plurality of reactors arranged preferably in order from a higher position to lower positions, reaction being effected at the boiling tempearture of the mixture, preferably with stirring while distillation of the produced water together with the carrier from the reaction system is carried out manually, or preferably by the use of a controlling system, introducing the condensate into a decanter, withdrawing the water alone and returning the carrier to the first reactor, introducing the over-flow from the first reactor into the second reactor, supplying carrier thereto, carrying out the reaction therein in the same manner as described for the first reactor and repeating the same operation in the third and successive reactors.

The monoester of phthalic acid which is continuously charged to the first reactor is readily obtained by mixing phthalic anhydride and a desired saturated alcohol having from 4 to 10 carbon atoms in a monoester preparation vessel situated prior to the first reactor.

As to the number of reactors to be utilized, there is no limitation as long as at least two are used. However, from the point of view of operation efficiency, simplicity and construction cost, the use of about 3 to 5 reactors is preferred.

The esterification reaction can be carried out in reactors with or without stirrers. But for the purpose of increasing the heat-transfer coefficient and promoting the evaporation of carrier, it is preferable to carry out stirring with stirrers in the reactors.

Esterification catalysts are well known in the art. For example, a strong mineral acid such as sulfuric acid or hydrochloric acid may be employed as the catalyst. In this case, sulfuric acid, which has the lesser volatility of the two, is preferred. Aluminum chloride, zinc chloride and Lewis acids such as boron trifluoride are also useful therefor. Aromatic and aliphatic sulfonic acids are the preferred catalysts since they provide esters of high quality.

The catalyst, for example, a sulfonic acid, is used in an amount of about 0.1 to 3% by weight of the reactants, although this may vary according to the reaction temperature and the particular starting alcohols utilized. The amount of the other catalysts mentioned hereinabove to be employed varies in a similar manner.

The temperature of reaction varies according to the particular starting alcohols utilized and also depends upon the stability of the esters produced. If the temperature is too high, pyrolysis or coloring of the product or a loss of alcohol occurs easily. On the other hand, if the temperature is too low, the speed of reaction is reduced and, accordingly, a greater number of reactors and/or large-volumed reactors are required. The preferred reaction temperature range is from about 100° to 200° C.

In selecting a reaction temperature, it is necessary to note that the solution of reactants is at the boiling state when he esterification reaction is effected and that the reaction temperature is determined by the composition of the reacting solution. Accordingly, if the total amount of required carrier is fed to the first reactor, the temperature of the first reactor and the reaction velocity are reduced excessively. On the contrary, if only a small amount of carrier is fed to the first reactor and no carrier is fed to the second and the successive reactors, the temperatures of these latter reactors are elevated, thereby causing problems and difficulties. In order to promote the reaction smoothly and in an advantageous manner, it is necessary to charge a suitable amount of carrier continuously to each of the reactors in order to maintain a suitable reaction temperature.

The carrier utilized should be inactive or inert with respect to the esterification reaction. Moreover, it should have a low solubility in water and be capable of forming an azeotropic composition with water. Suitable therefor are aromatic hydrocarbons such as benzene, toluene and xylene, alicyclic hydrocarbons such as cyclohexane, and aliphatic hydrocarbons such as hexane and octane. As the point at which an azeotropic composition forms between the water and the carrier employed must be lower than that of the starting alcohol-water composition, the carrier should be selected in this regard with respect to the particular alcohol utilized.

The amount of carrier circulated in each reactor has a great influence on the esterification reaction. When this amount is small and an insufficient carrying away of the water formed results thereby, the reaction does not proceed sufficiently. If too much carrier is used, an unnecessary useless heat loss is encountered.

The amount of water formed becomes less in succeeding reactors. Hence, a smaller circulation of water out of the reactors is sufficient in proceeding through successive reactors, the last reactor requiring the smallest circulation. However, since the amount of conversation to ester is higher in progressing from reactor to reactor, the influence of remaining water becomes greater in succeeding reactors, and if it is not controlled to a sufficient extent, the reaction velocity becomes relatively reduced by the influence of the reverse or back reaction and thus the reaction cannot be carried to completion. Accordingly, it is necessary to reduce the concentration of remaining water to as low a value as possible by using sufficiently circulating carriers even through the latter reactors in the chain.

The amount of carrier circulated varies according to the nature thereof. The amount of carrier required to take the water produced in the reactors and to remove it in the form of an azeotropic mixture may be calculated theoretically, however, as a practical matter, the amount of carrier should be more than the theoretical value. As an example thereof, 1 to 4 times the theoretical amount required in a reactor wherein 0–70% conversion is carried out should be employed. Similarly, 1.5 to 7 times the theoretical amount for a reactor effecting a 70–90% conversion, 2 to 50 times the theoretical amount for a reactor effecting a 90–97% conversion, and 6 to 70 times the theoreitcal amount for a reactor effecting a 97–99.5% conversion, respectively, should be employed. In practice, it is preferable to maintain the amount of carrier circulation in each reactor at the same value.

As can be seen from the above discussion, if the composition, temperature and the amount of carrier circulation are maintained at constant values respectively in each reactor, the conversions effected in each reactor also become constant and a stationary state is thereby established. This makes possible a smooth, large-scale production of esters on a continuous basis. The maintenance of constant values for the feed of raw materials, catalysts and carrier can be readily realized by the use of constant feed pumps and flow regulators. The maintenance of carrier circulation at a constant amount merely involves maintaining the amount of heating steam at a constant value in each reactor. This can be effectively carried out by the use of flow regulators for the steam. The steam flow may be regulated by measuring the speed or velocity of the steam flow, but the regulation may also be effected by measuring the amounts of carrier being returned from the decanters to the reactors. Whichever method is used, it is quite possible to control the process automatically, thus eliminating the need of manual control.

The process of the present invention is applicable to the production of esters of phthalic acid with saturated alcohols, i.e., alkanols, of 4 to 10 carbon atoms. Thus, for example, alcohols such as butanol, pentanol, hexanol, heptanol, octanol, nonanol and decanol may be employed. While the primary saturated alcohols containing from 4 to 10 carton atoms are preferred in the process of the present invention, the isomeric secondary and tertiary alcohols within this range such as 2-butanol, isobutyl alcohol, tertiary butyl alcohol, 2-pentanol, 3-pentanol, neopentyl alcohol, 2,4-dimethyl-3-ethyl-3-hexanol, 2-octanol, 3-nonanol, 5-nonanol, and 4-decanol may also be utilized.

The features and advantages of the present invention wil become more clearly apparent from the following detailed description thereof which is to be read with reference to the accompanying drawing wherein, FIGURE 1 is a schematic representation of a useful procedural sequence for producing diesters of phthalic acid continuously in accordance with the present invention.

Referring to FIGURE 1, a desired alcohol containing from 4 to 10 carbon atoms is fed to a monoester preparation vessel 5 through a pipe 23 after heat exchange with the reacted product. Phthalic anhydride is fed to the monoester preparation vessel 5 through pipe 21 after being heated in heater 30. The esterification to monoester between the alcohol and the phthalic anhydride proceeds nearly to completion or 100% conversion if a retention time of about 0.5 hour and a temperature of about 140° C. are maintained in the monoester vessel.

Condenser 7 and decanter 12 draw the water formed in the monoester preparation vessel, which is of an extremely small amount, out of the system. A mixture of alcohol and of the monoester formed in the monoester preparation vessel is sent to reactor 1 by means of pump 19. A catalyst is supplied thereto by means of pipe 22 and a carrier by means of pipe 24. The water formed in the esterification reaction is distilled together with the carrier and, after condensation in condenser 8, the water-carrier mixture enters decanter 13. The water is withdrawn out of the system at this point and only the carrier is returned to the reactor through flowmeter 26.

Heating of the reactor is effected by steam sent through pipe 25, which is used to heat the steam. Means for regulating the amount of steam are not shown in FIGURE 1, but any conventional means known in the art may be utilized, as discussed hereinabove.

The reaction product from reactor 1 is sent to reactor 2 by a pump, if the reactors are placed on the same level, or by the over-flow due to the pressure head, if the reactors are placed successively on progressively lower levels.

The reaction is thus carried out in a similar manner in successive reactors in either of these arrangements. As shown in FIGURE 1, further successive reactors herein are the third and fourth reactors, respectively, following the above-mentioned second reactor. There is no need to supply catalyst to the third and fourth reactors, but, because of the reasons stated hereinabove, a supplementary amount of carrier is added to each of the successive reactors. This operation is carried out by means of pipe 24.

At the completion of reaction in the fourth reactor, the reaction product is sent to receiver 6 by means of pump 20 after being cooled by means of heat exchanger 17 and cooler 18. It is desirable to keep the level of reaction solution regulated so as to be constant in each reactor in order to maintain the amount of flow in the fourth reactor at a constant value.

The following specific examples are given merely as illustrative of the present invention and are not to be considered as limiting.

EXAMPLE 1

Dibutyl phthalate is produced in a reaction apparatus as shown in FIGURE 1. The reaction conditions and the amount and composition of the reaction product obtained are as follows:

REACTION CONDITIONS
Volume of monoesterification vessel: 1.1 m.³
Volume of reactors (1–4): 2.8 m.³ each

| | Monoesterification Vessel | Reactors | | | |
|---|---|---|---|---|---|
| | | 1st | 2d | 3d | 4th |
| Feed of butanol, kg./hr | 1,000 | | | | |
| Feed of phthalic anhydride, kg./hr | 1,000 | | | | |
| Feed of paratoluenesulfonic acid, kg./hr | *21 | | | | |
| Mean retention time, hrs | 0.55 | 1.25 | 1.25 | 1.25 | 1.25 |
| Reaction temperature, ° C | 130 | 145 | 145 | 145 | 145 |
| Extent of esterification conversion, percent | | 80 | 94 | 98 | 99.4 |
| Carrier (benzene) circulation, kg./hr | | 400 | 500 | 400 | 400 |
| Feed of carrier (benzene), kg./hr | | 200 | 30 | 20 | 10 |

* Solution of 1 part p-toluene sulfonic acid dissolved in about 5 parts of butanol.

Amount of reaction product obtained: 2237 kg./hr.

Composition of reaction product (%):
    Dibutyl phthalate _____ 85.4
    Butanol _____ 4.1
    Monobutyl phthalate _____ 0.4
    Para-toluenesulfonic acid _____ 0.9
    Carrier (benzene) _____ 11.2

EXAMPLE 2

Di-2-ethylhexyl phthalate is produced in a reaction apparatus as shown in FIGURE 1. The reaction conditions and the amount and composition of the reaction product obtained are as follows:

REACTION CONDITIONS
Volume of monoesterification vessel: 1.1. m.³
Volume of reactors (1–4): 3.3. m.³ each

| | Monoesterification Vessel | Reactors | | | |
|---|---|---|---|---|---|
| | | 1st | 2d | 3d | 4th |
| Feed of 2-ethylhexanol, kg./hr | 1,408 | 132 | | | |
| Feed of phthalic anhydride, kg./hr | 785 | | | | |
| Feed of p-toluenesulfonic acid, kg./hr | *7 | | | | |
| Mean retention time, hrs | 0.5 | 1.5 | 1.5 | 1.5 | 1.5 |
| Reaction temperature, ° C | 150 | 180 | 180 | 180 | 180 |
| Extent of esterification conversion, percent | | 75.3 | 92.90 | 97.47 | 99.00 |
| Carrier (cyclohexane) circulation, kg./hr | | 650 | 650 | 650 | 650 |
| Feed of carrier (cyclohexane), kg./hr | | 90 | 9 | 6 | 3 |

*Solution of p-nitrotoluenesulfonic acid in 2-ethylhexanol.

Amount of reaction product obtained: 2355 kg./hr.

Composition of reaction product (%):

| | |
|---|---|
| Di-2-ethylhexyl phthalate | 87.46 |
| 2-ethylhexanol | 6.7 |
| Cyclohexane | 4.6 |
| p-Toluenesulfonic acid | 0.34 |
| Mono-2-ethylhexyl phthalate | 0.8 |

The invention being thus described, it will be obvious that the same may be varied in many ways. Such variations are not to be regarded as a departure from the spirit and scope of the invention and all such modifications are intended to be included within the scope of the following claims.

What we claim is:

1. A continuous process for the production of diesters of phthalic acid and saturated alcohols containing from 4 to 10 carbon atoms which comprises continuously feeding a monoester of phthalic acid and a saturated alcohol containing from 4 to 10 carbon atoms, a carrier inert with respect to the esterification reaction and capable of forming an azeotropic mixture with water and an esterification catalyst to the first of a plurality of reactors, while maintaining esterification reaction conditions within said first reactor, distilling said carrier and the water formed during the esterification from the reaction system as an azeotropic distillate, condensing the distillate into an aqueous layer and a carrier layer, separating the carrier layer from the aqueous layer, returning said separated carrier to said first reactor, introducing the reaction solution containing the carrier and being substantially free of water from said first reactor to the second reactor within said plurality of reactors, supplying the carrier to said second reactor, maintaining esterification reaction conditions within said second reactor in order to effect reaction in a similar manner as that carried out in said first reactor, and effecting reaction within each successive reactor within said plurality of reactors in the same manner as in said second reactor to obtain the desired reaction product.

2. The process of claim 1, wherein said carrier is at least a member selected from the group consisting of aromatic hydrocarbons, alicyclic hydrocarbons and aliphatic hydrocarbons.

3. The process of claim 1, wherein the reaction mixture is stirred within each reactor.

4. The process of claim 1, wherein the esterification is carried out at a temperature of about 100° C. to 200° C. within each reactor.

5. The process of claim 1, wherein the amount of said carrier supplied to each reactor within said plurality of reactors is maintained at the same value.

6. The process of claim 1, wherein said esterification catalyst is employed in amounts of from about 0.1 to 33% by weight of the reactants.

7. The process of claim 1, wherein a constant level is maintained throughout each of the reactors within said plurality of reactors in order to keep the amount of flow therethrough at a constant value.

8. The process of claim 1, wherein said saturated alcohol is 1-butanol, said carrier is a member selected from the group consisting of benzene and cyclohexane and said esterification catalyst is p-toluenesulfonic acid.

9. A continuous process for the production of dibutyl phthalate which comprises continuously feeding monobutyl phthalate, 1-butanol, a carrier and an esterification catalyst to the first of a plurality of reactors, said carrier being inert with respect to the esterification reaction and being capable of forming an azeotropic mixture with water, maintaining said first reactor at a temperature of from about 100° C. to 200° C., distilling said carrier and the water formed during the esterification from the reaction system as an azeotropic distillate, condensing the distillate into an aqueous layer and a carrier layer, separating the carrier layer from the aqueous layer, returning said separated carrier to said first reactor, introducing the reaction solution containing the carrier and being substantially free of water from said first reactor to the second reactor within said plurality of reactors, supplying the carrier to said second reactor, maintaining said second reactor at a temperature of from about 100° C. to 200° C. in order to effect reaction in a similar manner as that carried out in said first reactor, and effecting reaction with each successive reactor within said plurality of reactors in the same manner as in second reactor to obtain the desired dibutyl phthalate.

10. The process of claim 9, wherein said carrier is a member selected from the group consisting of benzene and cyclohexane.

References Cited

UNITED STATES PATENTS 2,759,967    8/1956    Cash et al. _____ 260—475

OTHER REFERENCES

Loury et al. Société Chimique de France (Paris) Bulletin, pp. 349–351, 1947.

JAMES A. PATTEN, Primary Examiner

E. JANE SKELLY, Assistant Examiner